United States Patent [19]

Fetzer et al.

[11] Patent Number: 4,953,054
[45] Date of Patent: Aug. 28, 1990

[54] CIRCUIT FOR PROTECTION AGAINST FAULT CURRENTS

[76] Inventors: Gerhard Fetzer, Mühlhaldenstr. 25; Axel Behrens, Uhlandstrasse 44, both of 7306 Denkendorf, Fed. Rep. of Germany

[21] Appl. No.: 207,733

[22] Filed: Jun. 16, 1988

[30] Foreign Application Priority Data

Jun. 19, 1987 [DE] Fed. Rep. of Germany ....... 3720312

[51] Int. Cl.[5] .............................................. H02H 3/08
[52] U.S. Cl. ......................................... 361/45; 361/87
[58] Field of Search ...................... 361/87, 93, 86, 94, 361/88, 23, 31, 33, 44, 45; 363/34, 50, 52, 55; 336/170, 188, 226

[56] References Cited

U.S. PATENT DOCUMENTS

| | | | |
|---|---|---|---|
| 4,159,499 | 6/1979 | Bereskin | 361/45 X |
| 4,437,133 | 3/1984 | Rueckert | 363/55 X |
| 4,542,432 | 6/1985 | Nichols, III et al. | 361/45 X |

FOREIGN PATENT DOCUMENTS 39280 11/1981 European Pat. Off. .
2407592 6/1979 France .

Primary Examiner—Derek S. Jennings
Attorney, Agent, or Firm—McGlew & Tuttle

[57] ABSTRACT

A circuit arrangement for protection against fault currents in power supplies, having an energy storage means, such as frequency converters for the operation of three-phase motors. The arrangement comprises two identical detector windings in the supply lines leading to the power supply so that a differential current detector winding connected with such detector windings causes a circuit breaker device to be actuated when a given value is exceeded. This circuit breaker device interrupts all the supply lines between the power supply and a load connected therewith by means of switching paths. This ensures that despite the energy stored in the power supply there is rapid and reliable switching off of the load should a fault current occur.

11 Claims, 2 Drawing Sheets

CIRCUIT FOR PROTECTION AGAINST FAULT CURRENTS

BACKGROUND OF THE INVENTION.

The present invention relates to a circuit arrangement for protection against fault currents in connection with power supplies having energy storing means, more especially for use with frequency converters for the operation of three-phase motors, with two identical detector windings placed on two current supply lines so that by means of a differential current detector winding coupled with these detector windings a circuit breaker may be tripped when a given value is exceeded.

Fault currents occur in defective equipment with and without grounding and may present a hazard for the owner or operator. The occurrence of fault currents makes itself felt for example by the presence of different amperages in power supply lines which are otherwise symmetrically loaded.

Such circuit arrangements for protection against fault currents have been proposed for instance in the German unexamined specification Nos. 3,048,785 and 3,633,787. These known circuit arrangements are placed in the line supply leads of an item of electrical equipment and when a fault current occurs they interrupt one of the supply leads. Such known devices are not suited to use for protection against fault currents in connection with power supplies with an energy storage means since the energy storage means involves the danger that the load connected with the supply will still receive a hazardous voltage even after a switching down of the power supply so that such stored energy will cause the load to perform erratic movements. A known system for interrupting the supply of current to a DC power supply does not guarantee rapid switching off of the output voltage at the output, as for example at the output of a frequency converter, since a substantial amount of energy is stored in the intermediate circuit capacitor of the DC power supply. Completely regular or reproducible switching off of the device then leaves much to be desired and may be so poor that strict government regulations are not fulfilled or maximum safety standards are not met.

BRIEF SUMMARY OF THE INVENTION.

Accordingly one object of the present invention is to provide a circuit arrangement for protection against fault currents for power supplies with an energy storing means of the initially mentioned type which so operates that on the detection of a differential current at the input of the power supply rapid and reliable switching off of the load takes place despite the stored energy.

In order to achieve this or other aims appearing herein the circuit breaker device includes current paths interrupting all supply lines between the power supply and a load which is connected therewith.

The interruption of all the current paths directly on the input side of the load means that the stored energy is no longer able to affect the load so that there is a very secure and rapid turning off of the load. Government regulations stipulating that the load has to be isolated within a time of 0.2 seconds may thus readily be complied with.

The features recited in the claims define the invention and further developments thereof.

It is possible to ensure a particularly high accuracy of switching if the voltage induced in the detector winding for the differential current is supplied to a threshold value stage, whose output signal causes a fault memory to be switched over via a switching input from a first switching condition into a second condition of switching, the fault memory in its second condition of switching causing the circuit breaker to be triggered. The threshold value stage makes it possible for an exact and reproducible limit value to be set for the fault currents, such limiting value being irrespective of the response threshold of the circuit breaker normally constructed in the form of a switching relay. The presence of the fault memory means that the occurrence of a fault current will be stored so that the current supply lead will be kept interrupted even if the fault current only occurred for a short interval of time. This leads to an increase in safety, since even transient fault currents can be hazardous. It is only after the removal of the causes of transient fault currents that the interruption of the power supply leads may be overridden.

Owing to the use of two threshold value switches in the threshold value stage, which is associated with the two possible directions of the fault current, it is possible for fault currents to be reliably and equally detected in both directions thereof.

The fault memory may be more especially a bistable switching stage of which the preferred form is an RS flipflop. For the automatic and systematic putting of the protected electrical device back into its operational state it is possible to use a trigger circuit resetting the fault memory into its first switching condition when the supply current is turned on again. By turning the device off and on or by pulling out and re-inserting the line plug it is possible to simply switch over the fault memory for the purpose of putting the device back into operation. If the cause of the fault current is still in existence there will then obviously be a switching back of the fault memory. It is obviously possible for the automatic reconnection of the interrupted switching paths to be performed by other means when the equipment is turned on again.

It is a simple matter for the circuit arrangement here in question to be supplemented by the addition of a monitoring circuit for at least one of the voltages occurring with little added complexity by connecting the output of the voltage monitoring circuit with the switching of input of the fault memory. In the event of there being a given deviation in one of these voltages a switch off signal will then be produced at this output switching over the fault memory. In this manner it is more especially possible to monitor the DC supply voltage and/or at least one auxiliary voltage so that at all times one may be certain of safe operation of the fault protection arrangement and of switching off together with an additional protection of the electronic components and protection against fire, a large number of components being used which are in any case present, the only extra device being a voltage comparator.

For protection against fault currents in the case of frequency converters connected with three-phase motors the circuit breaker device will best include additional means for interrupting at least one power supply lead in the DC power supply. This serves not only for the protection the user of a hand tool provided with a three-phase motor but also for the protection of the circuits themselves. A further increase in safety may be achieved if the circuit breaker device further possesses means for the additional latching or suppression of the control pulses for the semiconductor switches, and more especially the power semiconductors, in the frequency converter so that the switching off of the voltage is considerably accelerated.

The ends of the two detector windings are best connected with each other via a capacitor so that this arrangement may additionally serve for anti-interference purposes. Even if the windings are small a good anti-interference effect may be achieved by having large capacitors. The danger of saturation is reduced and it is possible to achieve an even current loading. This is more especially the case if the entire arrangement of the rectifier is placed on the output side of a rectifying device of the power supply. The connection of this arrangement is then directly adjacent to the frequency converter.

One working embodiment of the invention will now be described in detail with reference to the drawings.

LIST OF THE SEVERAL VIEWS OF THE DRAWINGS.

DETAILED ACCOUNT OF WORKING EXAMPLE OF THE INVENTION.

Figure 1:
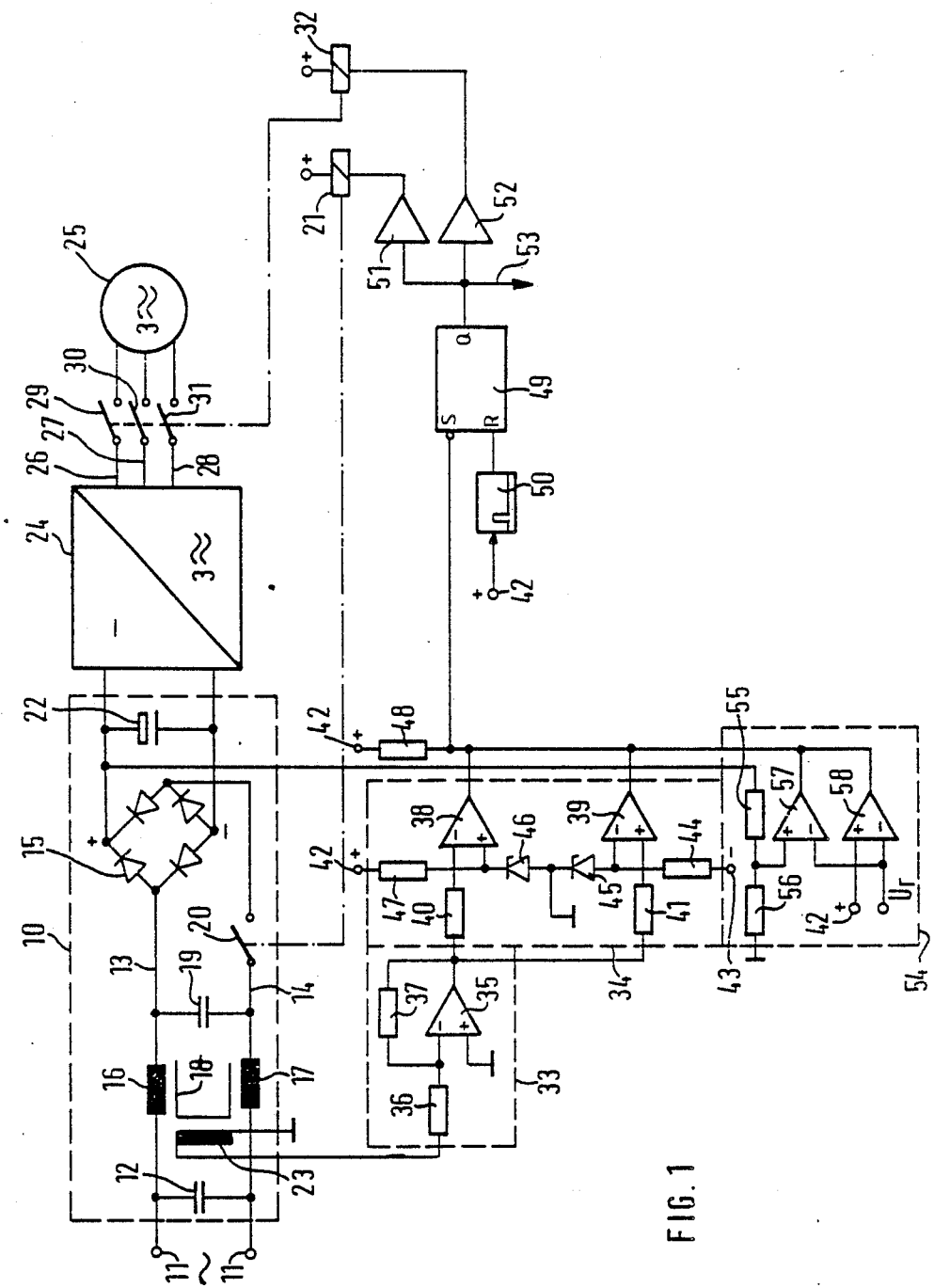
FIG. 1 shows an embodiment of the invention in the form of a circuit for protection against fault currents fitted to a frequency converter connected with a three-phase motor.

The circuit arrangement to be seen in FIG. 1 is such that a DC power supply 10 is able to be connected via two terminals 11 with the alternating line supply voltage. The terminals 11 connected together via a first capacitor 12 are connected via two power supply lines 13 and 14 with two AC connections of a full wave rectifier 15 made up of four rectifying diodes. Two symmetrical differential chokes 16 and 17 are placed on the power supply lines 13 and 14 and they have a common iron core 18. Their connections joined to the full wave rectifier 15 are connected together via a second capacitor 19 The switching path 20 of a first relay 21 is included in the lower power supply line 14 leading to the rectifier 15. The two DC connections of the full wave rectifier 15 are joined together via a smoothing capacitor 22. The common iron core of the differential chokes 16 and 17 carries a third winding serving as the differential current detector winding 23.

The two differential chokes 16 and 17 and the two capacitors 12 and 19 serve to prevent interference and are provided in any event, irrespectively of the fault current protection circuitry. The provision of the differential current detector winding 23 means that the differential chokes however also serve as part of a fault current sensor.

The DC produced in the DC power supply is supplied to a frequency converter 24 wherein it is converted into a three-phase current with a variable frequency and amplitude for the operation of a three-phase motor 25. Such an arrangement is more particularly suitable for the operation of electrical hand tools as described for instance in the German patent specification Nos. 3,247,046 and 3,709,983 which give a detailed account thereof.

Three power supply lines 26 through 28 leading to the three-phase motor 25 may be interrupted by three switching paths 29, 30 and 31 of a second relay 32.

For switching off on the occurence of a fault current one connection of the differential current detector circuit 23 is connected via an amplifier 33 with a threshold value stage 34, whereas the second connection of this differential current detector winding 23 is grounded. The amplifier 33 has as its main parts an operational amplifier 35, whose non-inverting input is grounded, whereas the inverting input is connected with an input resistor 36 and via a feedback resistor 37 with the output.

The threshold value stage 34 34 consists of two threshold value switches, for which in each case an operational amplifier 38 and 39 is provided, the outputs of which are connected together and form the output of the threshold value stage 34. The output of the amplifier 33 is in this respect connected via an input resistor 40 with the inverting input of the operational amplifier 38 and via an input resistor 41 with the non-inverting input of the operational amplifier 39. An auxiliary voltage source, symmetrical with respect to ground and which preferably is stabilized and derived from the DC of the DC power supply 10 (although the manner in which this is done is not shown), has a positive pole 42 and a negative pole 43. A series circuit arrangement consisting of a resistor 44, two Zener diodes 45 and 46 and a resistor 47 is placed between the negative pole 43 and the positive pole 42. The point of connection between the two Zener diodes 45 and 46 is grounded, while the connection point between the resistor 44 and the Zener diode 45 is connected with the inverting input of the operational amplifier 39. The connection point between the Zener diode 46 and the resistor 47 is connected with the non-inverting input of the operational amplifier 38.

The output of the threshold value stage 34 is connected both with the positive pole 42 via a resistor 48 and also with the set input S of an RS flipflop 49, which is used as a digital fault memory. The positive pole 42 of the auxiliary voltage source is connected via a trigger circuit 50 with the reset input R of this flipflop 49. The input of the trigger circuit 50 may be alternatively (or via an AND gate not shown) supplied with the DC of the DC power supply 10 or it may be supplied with a further auxiliary voltage. In a known manner the trigger circuit 50 produces an output signal when a voltage flank occurs at the input.

Via a respective amplifier 51 and 52 the output Q controls the two relays 21 and 32. Furthermore the output voltage of the flipflop 49 is supplied to the semiconductor switches, and more especially to the power semiconductors in the frequency converter 24 in such a way that the latter are turned off on the occurrence of a fault current.

The output of the voltage monitoring circuit 54 is also connected with the setting input S of the flipflop 49. A voltage divider consisting of two resistors 55 and 56 is connected between the positive pole of the DC power supply 10 and ground. The point of connection between the two resistors 55 and 56 is connected with the non-inverting input of an operational amplifier 57 placed in circuit as a voltage comparator, to whose inverting input a reference voltage $U_r$ is applied. The non-inverting input of a second operational amplifier 58, also placed in circuit as a voltage comparator, is connected with the positive pole 42 of the auxiliary voltage supply while the inverting input receives the reference voltage $U_r$. The outputs of the two operational amplifiers 57 and 58 are connected with each other and form the output of the voltage monitoring circuit 54.

The manner of operation of the circuitry shown is such that the currents flowing through the two differential chokes 16 and 17 compensate each other during normal operating conditions so that no voltage is induced in the differential detector winding 23. In this case the switching paths 20, 29, 30 and 31 are not interrupted. If a fault current should occur in the DC power supply 10, in the frequency converter 24 or in the three-phase motor 25, the flow of current through the differential chokes 16 and 17 will become asymmetrical and a voltage will be induced in the differential current detector winding 23 which is then amplified in the requisite manner in the amplifier 33. This amplified signal is supplied to the two operational amplifiers 38 and 39 placed in circuit as threshold value switches and of which one will produce an output signal in the event of a positive fault current exceeds a preset upper limit value and of which the other will produce a fault signal in the event of a negative fault current going below a given lower value. In this manner it is possible for fault currents of either polarity to be monitored. The limit or threshold values are in this respect set by the two Zener diodes 45 and 46. On the occurrence of such a fault signal the flipflop 49 is set via its setting input S from its first into its second condition. The output signal so produced switches off the two relays 21 and 23 via the amplifiers 51 and 52 so that the switching paths 20, 29, 30 and 31 are interrupted and the entire system is turned off. In order to enhance reliability, via the control line 53 at least the power semiconductor switches in the frequency converter 24 are also turned off. When the cause of the fault current has been dealt with then on switching the DC power supply 10 the positive pole 42 will be supplied with voltage so that the flipflop 49 is reset via the trigger circuit 50. This again leads to excitation of the two relays 21 and 32 and the completion of the corresponding switching paths 20, 29, 30 and 31.

If there is a failure or an improper alteration in the line or auxiliary voltage then via the monitoring circuit 54 the flipflop 49 is operated in such a manner that the two relays 21 and 32 are de-energized so that the frequency converter is again cut off from the line supply and the output of the frequency converter is not longer supplied with voltage. In this respect the operational amplifier 57 monitors the DC of the DC supply 10 by comparison with a reference voltage $U_r$, while the operational amplifier 58 carries out a similar comparison with the auxiliary voltage.

In the working embodiment of the invention shown switching off only takes place when there is a failure or drop in the line or auxiliary voltage. It is naturally also possible to also monitor for any improper increase in the voltage, for example using a window comparator.

The resetting of the flipflop 49 may naturally also take place in addition or alternatively using a suitable switch.

It is also possible to use an integrated circuit or a microcomputer in place of the circuitry illustrated. The microcomputer may for example contain not only the monitoring circuit but also the control circuit for the power unit of the frequency converter 24.

Figure 2:
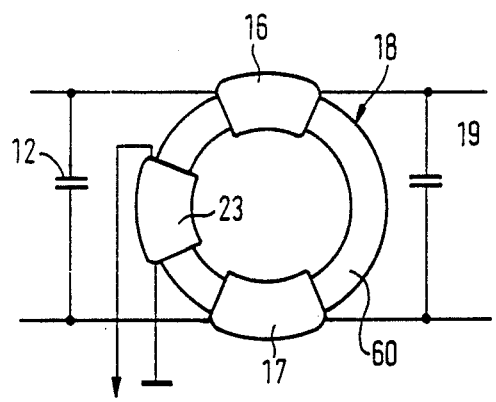
FIG. 2 shows the design of the sensor arrangement.

FIG. 2 shows the construction of the fault current sensor which in FIG. 1 was only illustrated diagrammatically. The two differential chokes 16 and 17 and the differential current detector winding 23 are arranged on an annular core 60. It would however naturally be possible for another form of iron core to be used, which is preferably in the form of a complete loop.

Although the circuit arrangement described is primarily suitable for protection against fault currents from frequency converters which are connected with three-phase motors, it would also be suitable for use in connection with other electronic equipment. It is more especially in movable and more particularly hand-held devices that such circuitry in accordance with the invention is of special significance since such equipment only has a limited possibility of grounding the individual components.

We claim:

1. A circuit arrangement for protection against fault currents in connection with a D.C. power supply having an energy storing means, comprising: first and second substantially identical detector windings positioned on two power supply leads connected with the power supply; a circuit breaker device; a differential current detector winding coupled with said first and second detector windings such that when a current induced in said differential current detector winding exceeds a set value said circuit breaker device is triggered, said circuit breaker device having switching paths adapted to interrupt all supply leads between the power supply and a load connected therewith; a threshold value circuit arranged to be supplied with voltage induced in said differential current detector winding; fault memory means arranged to be changed over between a first condition and a second condition by an output signal of said threshold value circuit, said output signal arriving at said fault memory via a switching input, said fault memory having a second condition for operation of said circuit breaker device, said threshold value circuit including a threshold switch means for reacting to positive and negative threshold values associated with the two possible fault current directions.

2. The circuit arrangement as claimed in claim 1 wherein said fault memory is in the form of a bistable circuit.

3. The circuit arrangement as claimed in claim 1 comprising a device reconnecting all interrupted switching paths on switching on the supply voltage even after previous response of the circuit breaker device.

4. The circuit arrangement as claimed in claim 3 wherein the means resetting the fault memory into its first switching condition on renewed switching on of the supply voltage is in the form of a trigger circuit.

5. The circuit arrangement as claimed in claim 1 comprising an amplifier for amplifying the voltage induced in the differential current detector winding.

6. The circuit arrangement as claimed in claim 1 wherein circuit breaker device additionally comprises means for interrupting the supply of current along at least one supply line in the DC power supply.

7. The circuit arrangement as claimed in claim 1 wherein the circuit breaker device comprises at least one relay.

8. The circuit arrangement as claimed in claim 1 wherein said circuit breaker device comprises means for locking or suppressing control pulses for a frequency converter.

9. The circuit arrangement as claimed in claim 1 wherein the ends of the first and second detector windings are respectively connected together by a capacitor.

10. The circuit arrangement as claimed in claim 1 wherein said fault memory is in the form an RS flipflop and said circuit breaker is adapted to suppress control pulses for a frequency converter adapted to supply three-phase motors.

11. A circuit arrangement for protection against fault currents in connection with a D.C. power supply having an energy storing means, comprising: first and second substantially identical detector windings placed on two power supply leads connected with the power supply; a circuit breaker device; differential current detector winding means, coupled with said first and second detector windings, for triggering said circuit breaker device when a current induced in said differential current detector winding means exceeds a set value, said circuit breaker device having switching paths adapted to interrupt all supply leads between the power supply and a load connected therewith; a threshold value circuit arranged to be supplied with voltage induced in the differential current detector winding means; a fault memory arranged to be changed over between a first condition and a second condition by an output signal of said threshold value circuit, said output signal arriving via a switching input, said fault memory second condition operating said circuit breaker device; and, a voltage monitoring circuit for monitoring at least one of a rectified supply voltage and an auxiliary voltage said monitoring circuit having an output supplying a switch off signal when there is a preset deviation in said at lease one of a rectified supply voltage and an auxiliary voltage, said output of said monitoring circuit being connected with a switching input of said fault memory.

* * * * *